(12) United States Patent
Hill

(10) Patent No.: US 8,209,093 B2
(45) Date of Patent: Jun. 26, 2012

(54) ADAPTIVE INSTRUCTION SYSTEM FOR A VEHICLE

(75) Inventor: Scott E. Hill, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 546 days.

(21) Appl. No.: 12/199,907

(22) Filed: Aug. 28, 2008

(65) Prior Publication Data

US 2010/0057308 A1    Mar. 4, 2010

(51) Int. Cl.
  *B60R 22/00* (2006.01)
  *E05F 15/00* (2006.01)
  *G05D 1/00* (2006.01)
  *G05D 3/00* (2006.01)
  *G06F 7/00* (2006.01)
  *G06F 17/00* (2006.01)

(52) U.S. Cl. ............ 701/49; 701/36; 701/400; 701/408; 701/541; 340/423.13; 340/426.15; 340/426.16; 340/426.24

(58) Field of Classification Search .......... 701/29, 701/213–216, 36, 45, 48, 49, 70, 400, 408, 701/538, 541; 340/426.13–426.19, 426.22–426.36; 455/345–346
See application file for complete search history.

(56) References Cited

U.S. PATENT DOCUMENTS

| | | | |
|---|---|---|---|
| 6,259,362 B1* | 7/2001 | Lin | 340/457 |
| 6,529,131 B2* | 3/2003 | Wentworth | 340/573.1 |
| 7,612,650 B2* | 11/2009 | Nakashima et al. | 340/5.72 |
| 2004/0145491 A1 | 7/2004 | Nascimento | |
| 2005/0099275 A1* | 5/2005 | Kamdar et al. | 340/426.18 |
| 2005/0164728 A1* | 7/2005 | Matsubara et al. | 455/521 |
| 2006/0046684 A1* | 3/2006 | Kameyama | 455/345 |
| 2006/0220806 A1* | 10/2006 | Nguyen | 340/426.36 |
| 2007/0126561 A1 | 6/2007 | Breed | |
| 2007/0290819 A1* | 12/2007 | Teshima et al. | 340/426.19 |
| 2009/0091477 A1* | 4/2009 | McCall et al. | 340/990 |

FOREIGN PATENT DOCUMENTS

EP        1361324 A2    12/2003

* cited by examiner

*Primary Examiner* — Hussein Elchanti
*Assistant Examiner* — Rami Khatib
(74) *Attorney, Agent, or Firm* — Young Basile Hanlon & MacFarlane PC

(57) ABSTRACT

Disclosed herein are instruction systems for a vehicle. One system comprises a condition sensor configured to detect and generate an output indicative of at least one vehicle condition, a user interface device and a position sensing system configured to detect and generate an output indicative of a user's position relative to a vehicle component. Each instruction is associated with a state of the at least one vehicle condition and the user's position relative to the vehicle component. A controller is programmed and configured to select one of the plurality of instructions based upon the vehicle condition as indicated by the condition sensor output and the user's position as indicated by the position sensing system. The instructions are provided to the user through the user interface device. Methods for using the system are also disclosed.

33 Claims, 5 Drawing Sheets

ADAPTIVE INSTRUCTION SYSTEM FOR A VEHICLE

FIELD OF THE INVENTION

The present invention relates to instruction systems for assisting operators of vehicles. In particular, the invention relates to instructions tailored to a particular activity the operator is attempting to accomplish.

BACKGROUND

Modern vehicles include many electronic systems and features that provide an increased level of convenience to the driver and passengers. Vehicles can include visual and auditory information designed to assist users in the operation of a vehicle. For example, if a door is ajar, a warning light may be illuminated on the dashboard or an auditory alert may be signaled. Vehicles can also provide remote activation devices, often taking the form of a small electronic fob that can be conveniently carried by the vehicle operator. The fob usually contains a radio transmitter that communicates with a receiver and control system of the vehicle. For example, when the user activates an "unlock" button on the fob, the fob sends a radio message to the vehicle control system, which then causes one or more of the door locks to open.

The user who is outside the vehicle can also be provided with warning type notices for certain types of vehicle system conditions. For example, an audible chime may be activated for such conditions as a vehicle light being on when a vehicle door is opened. Another example is an audible chime or buzzer that sounds when an ignition key is left in a vehicle ignition when the door is opened. In addition, vehicles may have wireless communication services, such as navigation and roadside assistance, to assist vehicle operators. Most of these services apply to a motor vehicle in operation, but more recently, portable navigation devices have been developed to assist a user outside of the vehicle.

SUMMARY OF THE INVENTION

Disclosed herein are instruction systems for a vehicle and methods of using the instruction systems. One embodiment of an instruction system for a vehicle comprises a condition sensor configured to detect and generate an output indicative of at least one vehicle condition, a user interface device, and a position sensing system configured to detect and generate an output indicative of a user's position relative to a vehicle component. A memory contains the plurality of instructions, and each instruction is associated with a state of the at least one vehicle condition and the user's position relative to the vehicle component. A controller is programmed and configured to select one of the plurality of instructions based upon the vehicle condition as indicated by the condition sensor output and the user's position as indicated by the position sensing system and to provide the instruction to the user via the user interface device.

Another embodiment of an instruction system for a vehicle comprises a condition sensor configured to detect and generate an output indicative of at least one vehicle condition, a portable user interface device, and at least one position sensor configured to detect a user's position relative to a vehicle component. A memory contains a plurality of instructions, each instruction associated with a state of the at least one vehicle condition and a user's position relative to the vehicle component. A controller is configured to determine the user's position based on an output from the at least one position sensor, select one of the plurality of instructions based upon the vehicle condition as indicated by the condition sensor output and the user's position as determined by the controller and provide the instruction to the user via the user interface device.

Also disclosed are methods of providing instructions to a user of a vehicle. One such method comprises first providing a controller preprogrammed with a plurality of instructions, each instruction associated with a state of at least one vehicle condition and a user's position relative to a vehicle component. The at least one vehicle condition is detected with a condition sensor, generating an output indicative of the at least one vehicle condition from the condition sensor. The user's position relative to the vehicle component is detected with a position sensing system, generating an output indicative of the user's position. The controller receives the condition sensor output and the position sensing system output and selects one of the plurality of instructions based upon the vehicle condition as indicated by the condition sensor output and the position sensing system output. The instruction is provided to the user through a user interface device.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
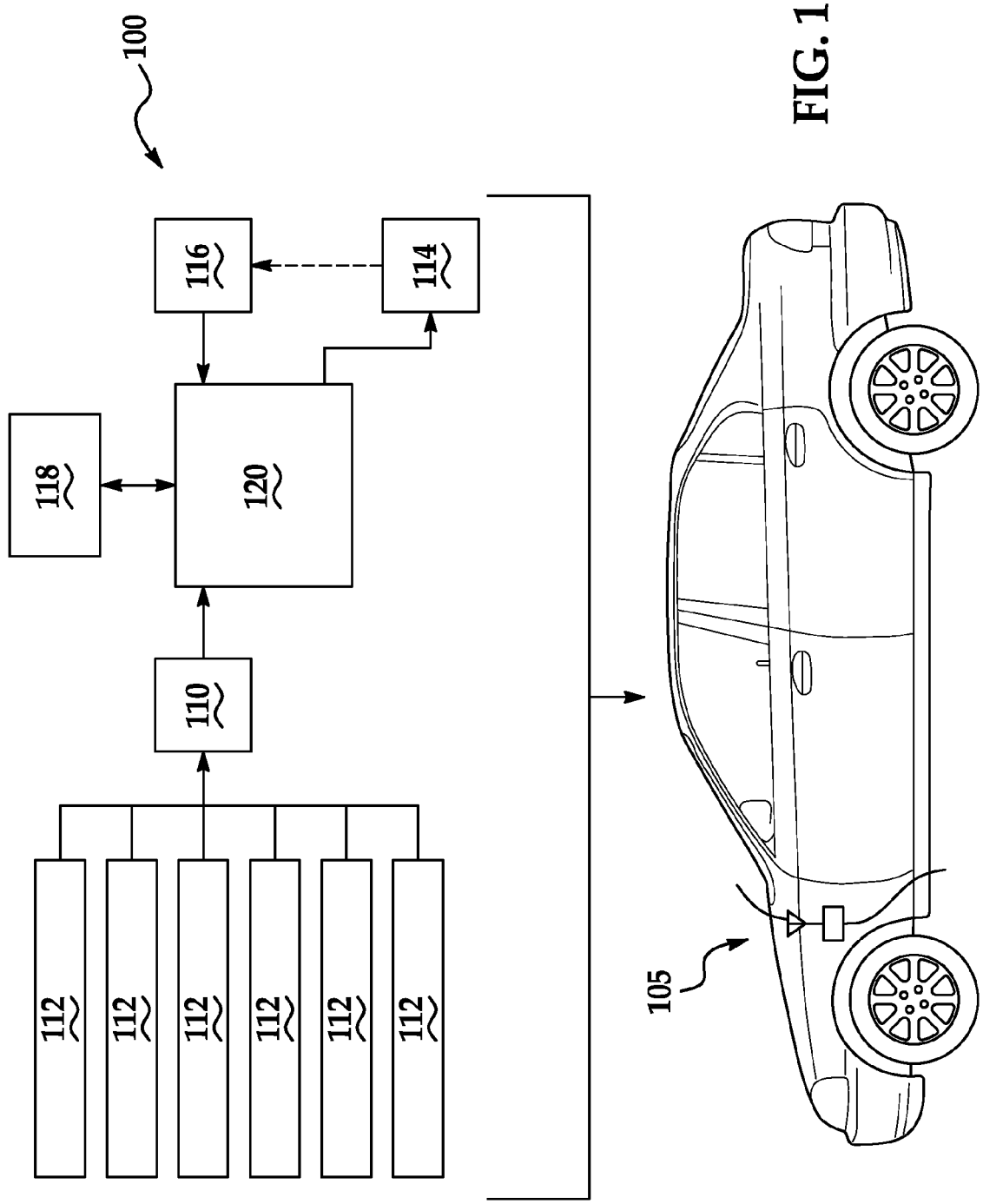
FIG. 1 is a schematic diagram of an embodiment of an instruction system for a vehicle as disclosed herein.

Referring to FIG. 1, an embodiment of an instruction system 100 for a vehicle 105 is illustrated. The instruction system 100 comprises a condition sensor 110 configured to detect and generate an output indicative of at least one vehicle condition 112, a user interface device 114, and a position sensing system 116 configured to detect and generate an output indicative of a user's position relative to a vehicle component. A memory 118 contains the plurality of instructions, and each instruction is associated with a state of the at least one vehicle condition 112 and the user's position relative to the vehicle 105 or vehicle component. A controller 120 is programmed and configured to select one of the plurality of instructions based upon the vehicle condition 112 as indicated by the condition sensor 110 output and the user's position as indicated by the position sensing system 116 and to provide the instruction to the user via the user interface device 114.

The condition sensor 110 is configured to sense a plurality of vehicle conditions 112. For example, the condition sensor 110 may sense a brake pedal status, a gear shift position status, a door position status, a trunk lid position, a door lock and unlock requests, an ignition switch status, an alarm status and a gas cap status. Other examples are seat position control status and vehicle light control status. Those with skill in the art will recognize that these are provided by way of example and not limitation, and many other vehicle conditions can be associated with the condition sensor 110. Examples of the status of various vehicle conditions 112 are provided in detail below.

The condition sensor 110 can communicate with the controller 120 with electronic communication or with wireless communication. Examples of wireless communication are radio frequency broadcast transmission and infra red transmissions. These are provided by way of example and not limitation and other means of communication known to those skilled in the art can be used.

The position sensing system 116 detects the user's position relative to the vehicle 105 or a component of the vehicle 105. A component of the vehicle 105 can be, for example, the trunk, the driver side door, the hood, the interior if the vehicle 105, a vehicle front or back seat, and the like. The position sensing system 116 can also sense when a user has remained stationary for a period of time, and can sense a change in position. The position sensing system 116 then generates an output correlating to the user's position and communicates that output to the controller 120. The position sensing system 116 can be located in one or more permanent positions on the vehicle 105, and/or can be incorporated into a portable unit that the user transports. The position sensing system 116 can be, for example, a sensor in a vehicle seat to detect whether the user is in the seat. The position sensing system 116 can be, for example, ultrasound or infrared sensors located at one or more positions in or on the vehicle 105 to detect the position of the user. Other non-limiting examples of position sensing systems are RFID and GPS.

The position sensing system 116 can comprise, for example, a handheld transmitter, such as a key fob, that relays the user's position to the controller 120. For example, the handheld transmitter can transmit signals and a vehicle antenna can triangulate the user's position. This can be reversed, with the vehicle antenna transmitting the signal and a handheld receiver triangulating the position. The user's position can be independently determined with, for example, a GPS portable navigation device and transmitted to a vehicle antenna. Those with skill in the art will recognize that these are provided by way of example and not limitation, and other position sensing systems can be used as desired or required.

The position sensing system 116 can communicate with the controller 120 with electronic communication or with wireless communication, depending on the type of system used. Examples of wireless communication are radio frequency broadcast transmission and infra red transmissions. These are provided by way of example and not limitation and other means of communication known to those skilled in the art can be used.

The memory 118 can be, for example, any computer memory such as RAM or hard drive. The memory 118 can be part of the controller 120 or can be a separate unit that communicates with the controller 120. The memory 118 and controller 120 can communicate with each other electronically or wirelessly if separate units.

The memory 118 is programmed with a plurality of instructions. These instructions can be programmed by the vehicle manufacturer during production or by another after market. The instructions programmed into the memory 118 can range from very basic to very detailed. The topics covered by the instructions will be based on the vehicle conditions 112 that can be detected by the condition sensor 110. The instructions can be associated with a typical user position and one or more vehicle conditions when inputted into the memory 118.

The instructions can be based on the vehicle manual that typically is provided when vehicles are manufactured. Examples of instructions are provided below.

The controller 120 can be, for example, a central processing unit. The controller 120 can be located in the vehicle 105 in any location desired or required by the manufacturer or installer. The controller 120 is programmed and configured to select one of the plurality of instructions based upon the vehicle condition 112 as indicated by the condition sensor 110 output and the user's position as indicated by the position sensing system 116. The controller 120 then provides the instruction to the user via the user interface device 114.

The controller 120 can be configured to select one of the plurality of instructions only after the user's position, as detected by the position sensing system 116, has remained unchanged for at least a predetermined time threshold. This time threshold can be, for example, twenty seconds, thirty seconds, one minute, two minutes, and the like. The time threshold can be preprogrammed, or can be manually overridden by the user. The controller 120 can also be configured to select one of the plurality of instructions only after the vehicle condition 112, as detected by the condition sensor, has remained unchanged for at least a predetermined time threshold. The controller 120 can be further configured to stop providing the instructions and, additionally or alternatively, select different instructions based on the user's input.

The user's input can be given through the user interface device 114, for example. The user interface device 114 can be permanently located or portable, such as a key fob. The user interface device can have a screen such as an LCD or touch screen such that the user can select options on the screen or type in instructions to the controller 120. The user's input can be given through a vehicle information display located in the vehicle 105 in the same manner. The user interface device can have buttons that the user presses to input requests. The device or display can be voice activated to communicate with the controller 120 to stop or change instructions. The controller 120 can also be programmed and configured to stop instructions or choose other relevant instructions based on a change in the condition sensor 110 output and/or a change in the position sensing system 116 output. The user input can stop the currently provided instruction or can disable the entire system. The system can be preprogrammed with a number or length of time the instructions are repeated, or the user can select or program the number or amount of time the instructions are given before the instructions cease.

As stated, the user interface device 114 can be located in the vehicle 105 or can be a portable device that is transported by the user. If located in the vehicle 105, the controller 120 can communicate with the user interface device 114 either electronically or wirelessly. The user interface device 114 can be part of the controller 120. If the user interface device 114 is portable, the controller 120 can communicate with the device wirelessly.

The controller 120 can provide instructions to the user interface device 114 audibly through speakers in the device. The audible instructions can be a computer generated voice or a recorded voice. The user interface device 114 can also have means to control volume of the audible instructions, mute audible instructions and means to disable the instruction receiver if the user so desires or requires. For example, buttons on a key fob, or a thumb wheel, or the like can be used to adjust volume or allow or disable instructions.

The controller 120 can provide instructions to the user interface device 114 visually through a viewing screen, such as an LCD screen. The user interface device 114 can provide to the user both audible and visual instructions simultaneously, or the user can choose his or her preferred way to receive the instructions. Beeps or other alarm sounds can be used to alert the user to visual instructions. Tactile feedback, such as vibration, can also be used alternatively or in addition to visual and audio instructions. The user interface device 114 can also have means to disable the current instructions or the instruction receiver if the user so desires or requires.

The instructions can be repeated at predetermined intervals until one or more of the status of the vehicle conditions changes, the user position changes, the user manually stops the instructions, or a predetermined time period has expired. If nothing changes or the user position changes, the controller can access different relevant instructions relating to the user position and another vehicle condition.

If the user interface device 114 is portable, the device can incorporate a handheld transmitter as the position sensing system 116. The incorporated device can be, for example, a key fob or the like. It is further contemplated that the user interface device 114 can also incorporate the controller 120. Again, the incorporated device can be a key fob or the like.

Figure 2:
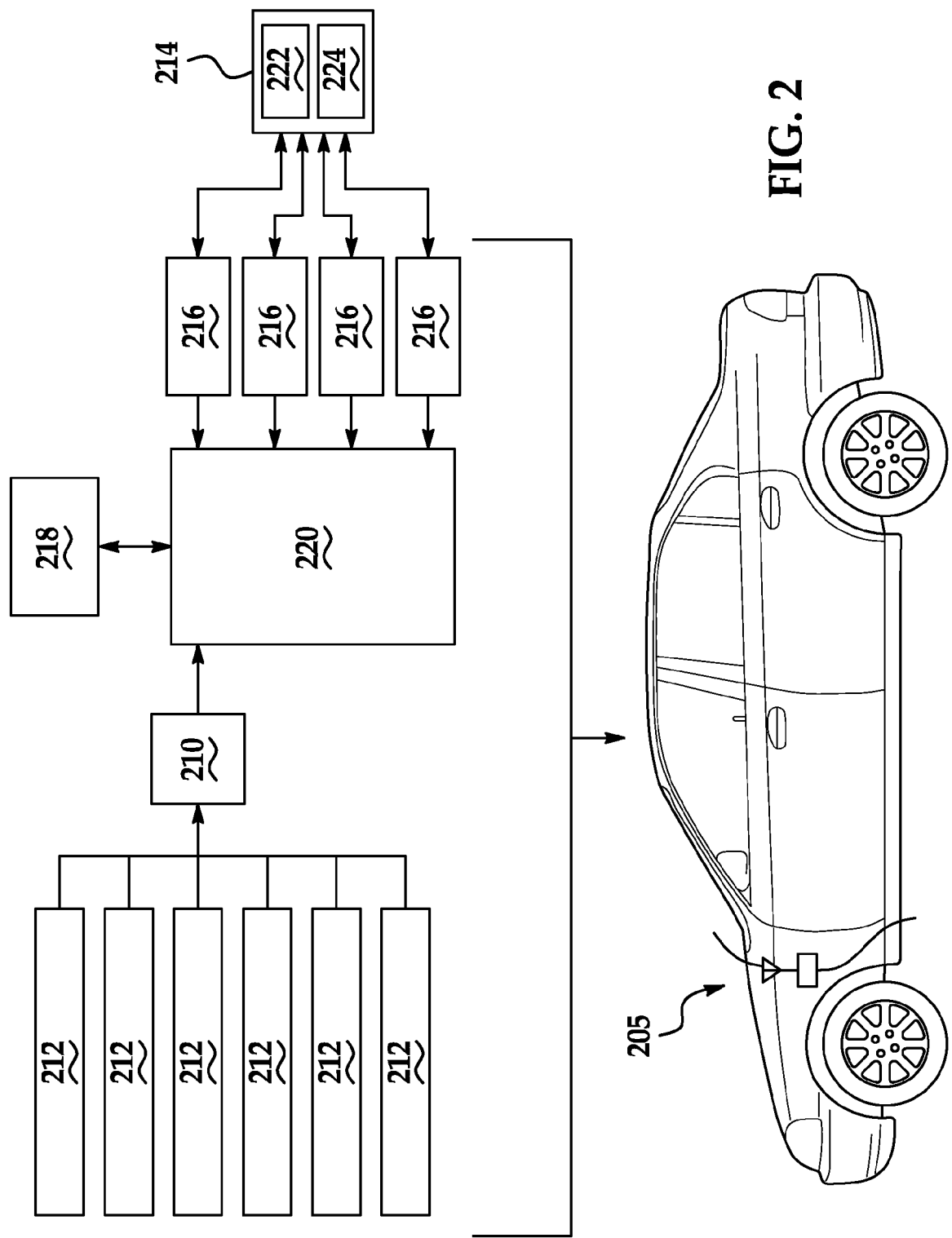
FIG. 2 is a schematic diagram of another embodiment of an instruction system for a vehicle as disclosed herein.

Referring now to FIG. 2, another embodiment of an instruction system for a vehicle is disclosed. The instruction system 200 of this embodiment comprises a condition sensor 210 configured to detect and generate an output indicative of at least one vehicle condition 212 as in the first described embodiment. The system 200 also comprises a portable user interface device 214 and at least one position sensor 216 configured to detect a user's position relative to a vehicle 205 or a component of a vehicle 205. A memory 218 contains a plurality of instructions, each instruction associated with a state of the at least one vehicle condition 212 and a user's position relative to the vehicle 205 or vehicle component. A controller 220 is configured to determine the user's position based on an output from the at least one position sensor 216, select one of the plurality of instructions based upon the vehicle condition 212 as indicated by the condition sensor 210 output and the user's position as determined by the controller 220 and provide the instruction to the user via the user interface device 214.

The portable user interface device 214 can be, for example, a key fob. The controller 120 can provide instructions to the portable user interface device 214 audibly through a speaker 222 in the device. The audible instructions can be a computer generated voice or a recorded voice. The controller 220 can provide instructions to the portable user interface device 214 visually through a viewing screen 224, such as an LCD screen. The controller 220 can also provide tactile feedback, such as vibration, to alert the user of visual and/or audible instructions. Audible beeps or other sounds can also be used to alert the user of visual instructions. The portable user interface device 214 can provide to the user both audible and visual instructions simultaneously, or the user can choose his or her preferred way to receive the instructions. The provisions of instructions are provided as examples and are not meant to be limiting.

The portable user interface device 220 can also have means to control volume and muting of the audible instructions and means to disable the instruction receiver if the user so desires or requires, either directly on the portable user interface device 214 or in the vehicle 205, for either the current instructions or for future instructions. Buttons and thumb wheels on the portable user interface device 220 are examples of means to control volume or disable instructions.

The at least one position sensor 216 can use ultrasound, infrared, RFID, and GPS. The portable user interface device 214 can incorporate a handheld transmitter and the at least one position sensor 216 can be at least one receiver, wherein the at least one receiver triangulates the user's position based on the transmission. The at least one position sensor 216 can be, for example, at least one transmitter that is mounted in or on one or more locations of the vehicle 205, such that the user interface device 214 having a receiver can triangulate the user's position. The user's position can be determined independently, for example, with a GPS device and transmitted to a vehicle antenna. These position sensor systems are provided by way of example and not limitation, and other position sensing systems know to those skilled in the art can be utilized.

The position information is communicated to the controller 220. In addition, the position sensor 216 can also communicate if the user remains stationary for a predetermined period of time or is the user changed position.

When the controller 220 has calculated the user's position based on an output from the at least one position sensor 216 and has received a vehicle condition 212 as indicated by the condition sensor 210 output, the controller 220 is configured to select one of the plurality of instructions programmed in the memory 218 relevant to the position and condition. The controller 220 then provides the instruction to the user via the portable user interface device 214.

The instructions can be repeated at predetermined intervals until one or more of the status of the vehicle conditions changes, the user position changes, the user manually stops the instructions, or a predetermined time period has expired. If nothing changes or the user position changes, the controller can access different relevant instructions relating to the user position and another vehicle condition.

Figure 3:
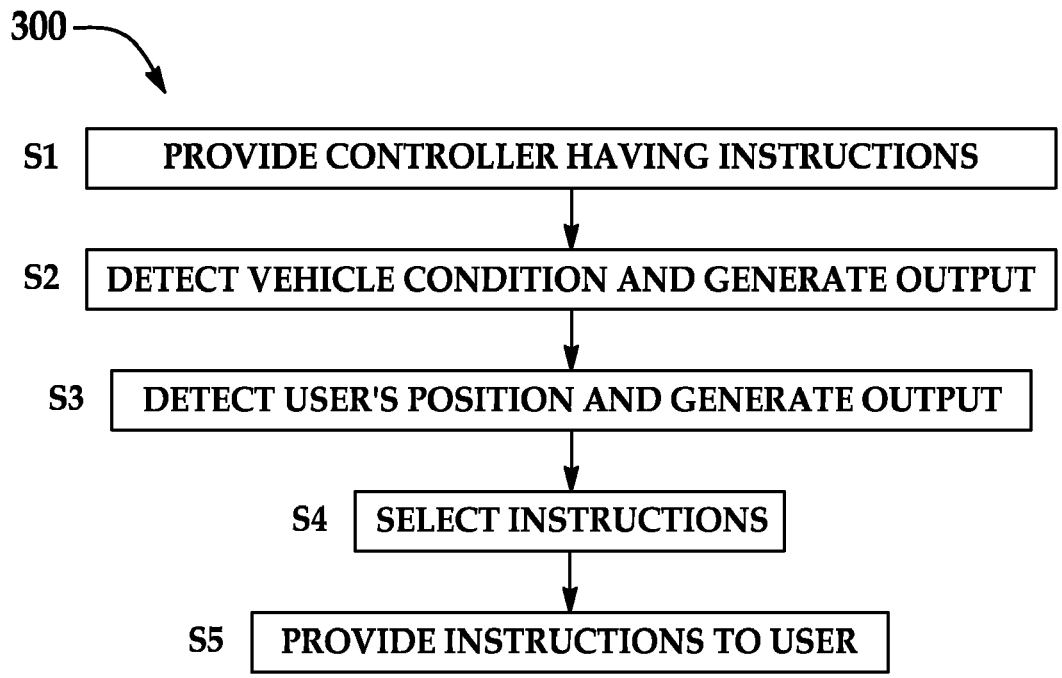
FIG. 3 is a flow chart of an embodiment of a method of providing instructions to a user of a vehicle as disclosed herein.

Referring to FIG. 3, an embodiment of a method of providing instructions to a user of a vehicle is described. One such method 300 comprises first providing a controller preprogrammed with a plurality of instructions (S1), each instruction associated with a state of at least one vehicle condition and a user's position relative to a vehicle component. The at least one vehicle condition is detected with a condition sensor, generating an output indicative of the at least one vehicle condition from the condition sensor (S2). The user's position relative to the vehicle component is detected with a position sensing system, generating an output indicative of the user's position (S3). The controller receives the condition sensor output and the position sensing system output and selects one of the plurality of instructions based upon the vehicle condition as indicated by the condition sensor output and the position sensing system output (S4). The instruction is provided to the user through a user interface device (S5).

The controller provided in S1 can be programmed with a plurality of instructions by the manufacturer or an after market supplier. The controller can be, for example, a central processing unit. The controller can be located in the vehicle in any location desired or required by the manufacturer or installer or can be integrated in with the user interface device. The controller can have a separate memory such as a RAM or hard drive that stores the instructions. The memory can be part of the controller or can be a separate unit that communicates with the controller.

The instructions programmed into the controller can range from very basic to very detailed. The topics covered by the instructions will be based on the vehicle conditions that are detected by the condition sensor. The instructions can be associated with a typical user position and one or more vehicle conditions when inputted into the controller. The instructions can be based on the vehicle manual that typically is provided when vehicles are manufactured. Examples of instructions are provided below.

In S2, the condition sensor can sense a plurality of vehicle conditions. For example, the condition sensor may sense a brake pedal status, a gear shift position status, a door position status, a trunk lid position, a door lock and unlock requests, an ignition switch status, an alarm status and a gas cap status. Other examples are seat position control status and vehicle light control status. Those with skill in the art will recognize that these are provided by way of example and not limitation, and many other vehicle conditions can be associated with the condition sensor. Examples of the status of various vehicle conditions are provided in detail below. The condition sensor generates an output indicative of the condition sensed.

In S3, the position sensing system detects the user's position relative to the vehicle or a component of the vehicle. The position sensing system then generates an output correlating to the user's position and communicates that output to the controller. The position sensing system can be located in one or more permanent positions on the vehicle, and/or can be incorporated into a portable unit that the user transports as in the second described embodiment. Those with skill in the art will recognize that these are provided by way of example and not limitation, and other position sensing systems can be used as desired or required.

In S4, the controller selects one of the plurality of instructions based upon the vehicle condition as indicated by the condition sensor output and the user's position as indicated by the position sensing system.

In S5, the controller 120 then provides the instruction to the user via the user interface device. The user interface device can be located in the vehicle or can be a portable device that is transported by the user. The controller can provide instructions to the user interface device audibly through speakers in the device. The audible instructions can be a computer generated voice or a recorded voice. The controller can provide instructions to the user interface device visually through a viewing screen, such as an LCD screen. The user interface device can provide to the user both audible and visual instructions simultaneously, or the user can choose his or her preferred way to receive the instructions. The user interface device can also have means to control volume of the audible instructions and means to disable the instruction receiver if the user so desires or requires.

If the user interface device is portable, the device can incorporate a handheld transmitter as the position sensing system. The incorporated device can be, for example, a key fob or the like and can incorporate a handheld transmitter to communicate with one or more position sensors. The portable user interface device can be configured to emit a signal indicative of the user's position and the position sensors detect the strength of the signal from the transmitter in the portable user interface device. The position sensor can be, for example, an antenna or receiver that is mounted in or on one or more locations of the vehicle, such that the one or more positions sensor can pinpoint the user from the distance and direction the handheld transmitter is from the sensor.

The controller can be configured to select one of the plurality of instructions only after the user's position, as detected by the position sensing system, has remained unchanged for at least a predetermined time threshold. This time threshold can be, for example, twenty seconds, thirty seconds, one minute, two minutes, and the like. The time threshold can be preprogrammed, or can be manually overridden by the user. The controller can also be configured to select one of the plurality of instructions only after the vehicle condition, as detected by the condition sensor, has remained unchanged for at least a predetermined time threshold.

The controller can be further configured to stop providing the instructions and, additionally or alternatively, selecting different instructions based on the user's input. The user's input can be given through the user interface device, for example, or through a vehicle information display located in the vehicle. In either case, the device or display can be voice activated to communicate with the controller to stop or change instructions. The controller can also be programmed and configured to stop instructions or choose other relevant instructions based on a change in the condition sensor output and/or a change in the position sensing system output.

Non-limiting examples of the instruction systems for a vehicle and methods of instruction disclosed herein are provided below.

A controller is programmed and configured with a plurality of instructions relevant to particular vehicle conditions and user positions. The at least one condition sensor is providing the status of the at least one vehicle condition to the controller. The at least one vehicle sensor continuously updates the controller as the at least one status changes. Examples of vehicle conditions that can be sensed by a condition sensor include, but are not limited to, the status of a door request switch, the status of the brake pedal, the status of the gear shift lever, and the status of the hood release. Various conditions can be sensed and relayed to the controller. The number and type of conditions included in the instruction system are too numerous to include in the examples. Those with skill in the art will recognize the multiple combinations possible.

Figure 4:
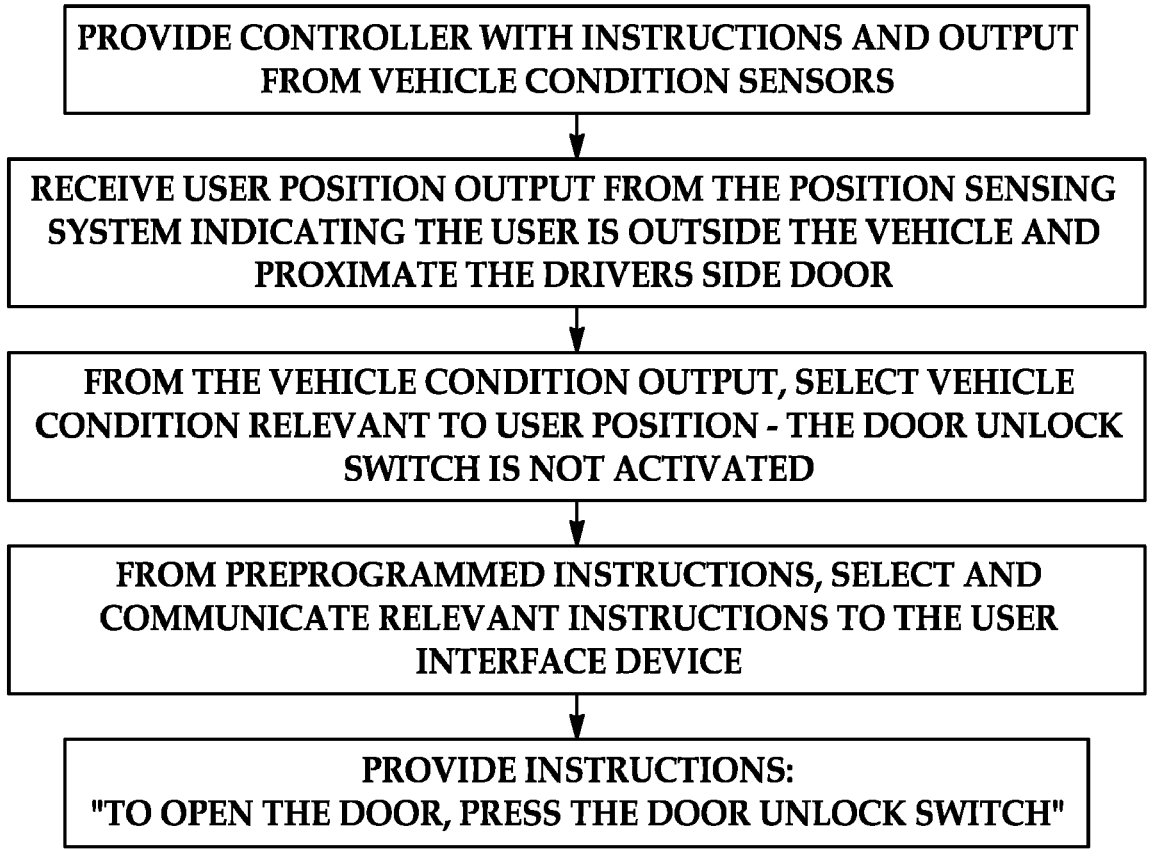
FIG. 4 is a flow chart of an example of a method of providing instructions to a user of a vehicle as disclosed herein.

In the examples provided, the vehicle instruction system has a preprogrammed controller with instructions and the condition sensors described above. Referring to FIG. 4, the position sensing system detects the user outside the vehicle and proximate the driver side door. The controller determines that the vehicle condition relevant to the user's position is the locked driver's side door. The output of the condition sensor communicated to the controller indicates that the door has not been unlocked. The controller chooses the relevant instructions and sends to the user interface device, either audibly, visually, or both audibly and visually, the instructions that the door request switch must be activated to unlock the vehicle door.

The instructions can be repeated at predetermined intervals until one or more of the status of the vehicle conditions changes, the user position changes, the user manually stops the instructions, or a predetermined time period has expired. If nothing changes or the user position changes, the controller can access different relevant instructions relating to the user position and another vehicle condition.

Figure 5:
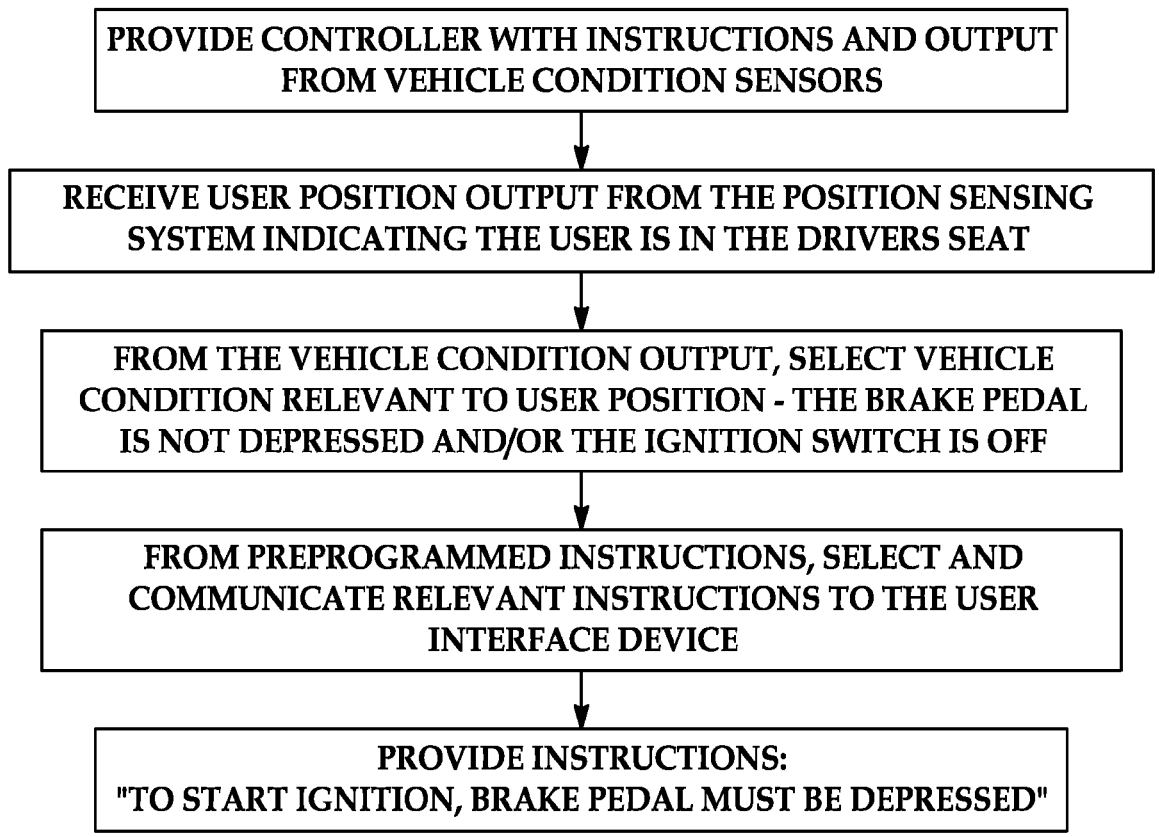
FIG. 5 is a flow chart of another example of a method of providing instructions to a user of a vehicle as disclosed herein.

Referring to FIG. 5, the position sensing system detects the user in the driver's seat. The controller accesses the relevant vehicle conditions, locating one or both the outputs from the brake pedal and the ignition switch. The status of the brake pedal generated by the condition sensor indicates that the brake pedal is not depressed. At this time, the controller may choose a relevant instruction. The controller may also receive the ignition switch status—either the ignition is off or an attempt has been made to start the ignition. In any case, the controller sends relevant instructions to the user interface device, instructing the user that the brake pedal must be depressed to start the engine.

Figure 6:
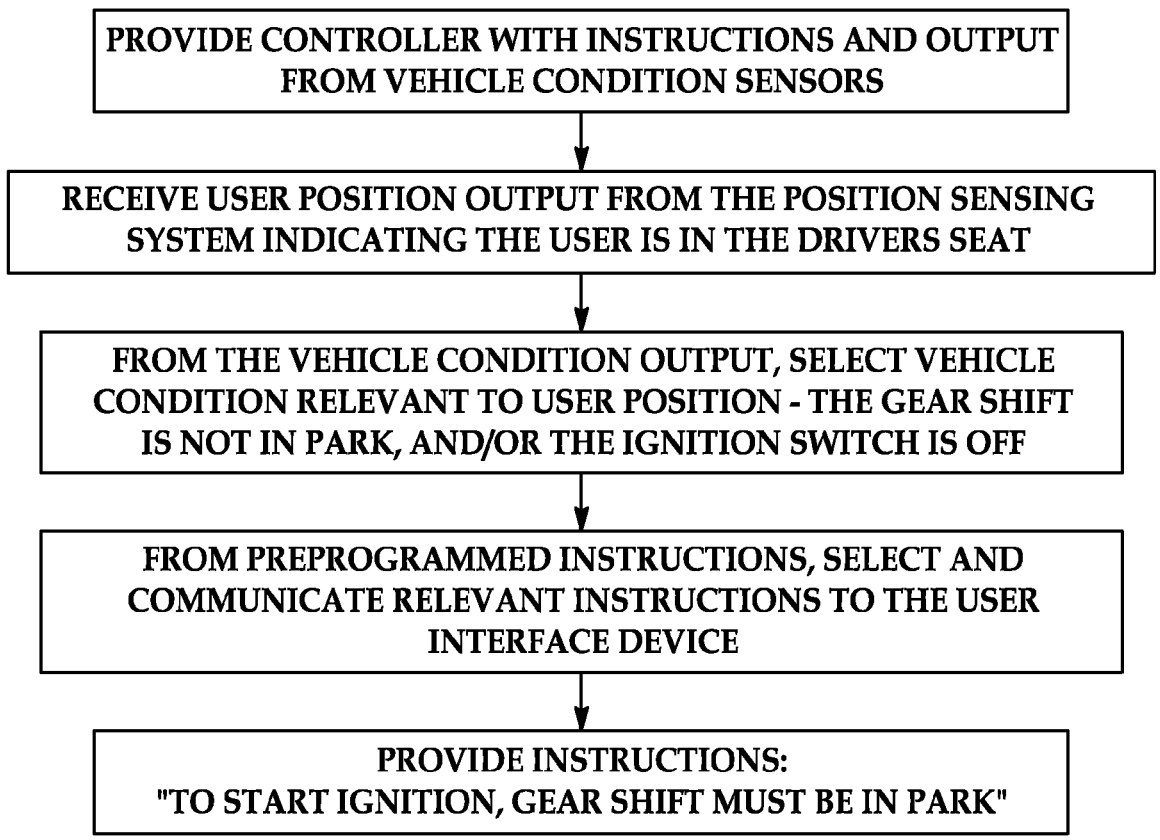
FIG. 6 is a flow chart of yet another example of a method of providing instructions to a user of a vehicle as disclosed herein.

Referring to FIG. 6, the position sensing system detects the user in the driver's seat. The controller accesses the relevant vehicle conditions, locating one or both the outputs from the gear shift and the ignition switch. The status of the gear shift generated by the condition sensor indicates that the gear shift is not in park. At this time, the controller may choose a relevant instruction. The controller may also receive the ignition switch status—either the ignition is off or an attempt has been made to start the ignition. In any case, the controller sends relevant instructions to the user interface device, instructing the user that the gear shift must be in park to start the engine.

Other examples include the position sensing system detecting the user in the vicinity of the trunk. The vehicle condition associated with the trunk indicates that it is closed. The controller can provide instructions to the user interface device to depress the trunk latch to open the trunk. Similar instructions could be provided to a user positioned at the hood of the car, with the instructions indicating to depress the hood latch.

The user interface device can also provide warnings to the user when the position sensor detects the user walking away from the vehicle. The warnings can include, for example, that the doors are unlocked, that the windows are down and that the interior and exterior lights are on. The system can be programmed to provide the warnings when the user is at a predetermined distance from the vehicle. The warnings are provided by way of example and not limitation and other warnings known to those skilled in the art can be provided.

The user interface device can also provide reminders to the user, such as reminders to lock doors, roll up windows, turn off lights. The reminders can be triggered by, for example, a change in a vehicle seat sensor or ignition sensor. The reminders are provided by way of example and not limitation and other reminders known to those skilled in the art can be provided.

Instructions can be associated with the climate control system, the audio system, a GPS system, a blue tooth system, a remote call system, etc. to assist the user in the use or operation of such devices.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An instruction system for a vehicle having a plurality of vehicle components, the system comprising:
   a condition sensor configured to detect and generate at least one output, each output indicative of a vehicle component condition reprenting an operational status of an associated vehicle component;
   a position sensing system including a portable user interface device and a position sensor configured to detect the location of the portable user interface device and generate an output indicative of a position of the portable user interface device relative to the associated vehicle component;
   a memory containing a plurality of instructions, each instruction comprising a suggested action to change the vehicle component condition of the associated vehicle component; and
   a controller programmed and configured to predict an intended action to change the vehicle component condition based on the vehicle component nearest the position of the portable user interface device and the output associated with the vehicle component; to select at least one of the plurality of instructions based on the predicted intended action; and to present the at least one selected instruction to change the vehicle component condition.

2. The instruction system of claim 1, wherein the at least one selected instruction is presented to the user via the portable user interface device and is at least one of an audible instruction and a visual instruction.

3. The instruction system of claim 1, wherein the controller is further configured to select the at least one instruction only after the user's position has remained unchanged for at least a predetermined amount of time.

4. The instruction system of claim 3, wherein the user's position is determined to be unchanged based on the portable user interface device remaining within a predetermined distance from the vehicle component.

5. The instruction system of claim 1, wherein the controller is further configured to select the at least one instruction only after the vehicle component condition has remained unchanged for at least a predetermined amount of time.

6. The instruction system of claim 1, wherein the at least one vehicle component is a brake pedal, a gear shift, a door, a trunk, a door lock, an ignition switch, an alarm status and a gas cap and the vehicle component condition is at least one of brake pedal status, gear shift position status, door position status, trunk lid position, door lock and unlock requests, ignition switch status, alarm status and gas cap status.

7. The instruction system of claim 1, wherein the controller is further configured to perform one or both of stopping the presentation of the at least one selected instruction and selecting at least one different instruction based on at least one of a change in the vehicle component condition being detected, a change in the user's position relative to the vehicle component being detected, a predetermined amount of time passing, a user action via the portable user interface device, and a user action via an onboard vehicle component.

8. The instruction system of claim 1, wherein the controller is located within the vehicle.

9. The instruction system of claim 1, wherein the controller is located within the user interface device.

10. The instruction system of claim 1, wherein the portable user interface device includes a transmitter configured to transmit the output indicative of the user's position and the position sensor includes a vehicle mounted receiver configured to receive the output indicative of the user's position.

11. The instruction system of claim 1, wherein the portable user interface includes a user control for wirelessly changing a vehicle component condition, and at least one of the instructions includes a suggestion to activate the user control.

12. The instruction system of claim 1, wherein the controller is further configured to communicate the at least one selected instruction to the portable user interface device, and the portable user interface device presents the instruction to the user.

13. The instruction system of claim 12, wherein the portable user interface device comprises an audio output device and a visual display configured to present the at least one selected instruction to the user.

14. The instruction system of claim 1, wherein the controller is further configured to present the at least one selected instruction via an onboard vehicle component.

15. The instruction system of claim 1, wherein the controller predicts the user's intended action based on both the user's position relative to the vehicle component and the vehicle component condition remaining unchanged for a predetermined amount of time.

16. The instruction system of claim 1, wherein the portable user interface device is configured to emit a signal indicative of the user's position and the position sensor detects the location of the portable user interface device based on a strength of the signal from the portable user interface device.

17. A method of providing instructions to change a vehicle component condition of a vehicle having a plurality of vehicle components, the method comprising:

detecting at least one vehicle component condition with a condition sensor, each vehicle component condition representing an operational status of one of the plurality of vehicle components, and generating an output indicative of the at least one vehicle component condition from the condition sensor;

detecting a position of a user interface device relative to the associated vehicle component with a position sensor and generating an output indicative of the position;

predicting an intended activity to change the vehicle component condition based on the vehicle component nearest the position of the user interface device and the output associated with the vehicle component indicative of the vehicle component condition;

selecting at least one instruction comprising a suggested action to change the vehicle component condition based upon the predicted intended activity; and presenting the at least one selected instruction through the user interface device.

18. The method of claim 17, wherein the presenting of the at least one selected instruction through the user interface is performed audibly.

19. The method of claim 17, wherein the presenting of the at least one selected instruction through the user interface is performed visually.

20. The method of claim 17, wherein the selecting of the at least one instruction occurs only after the user's position has remained unchanged for a predetermined period of time.

21. The method of claim 17, wherein the selecting of the at least one instruction occurs only after the vehicle condition has remained unchanged for a predetermined period of time.

22. The method of claim 17, wherein the at least one vehicle component is a brake pedal, a gear shift, a door, a trunk, a door lock, an ignition switch, an alarm status and a gas cap and the vehicle component condition is at least one of brake pedal status, gear shift position status, door position status, trunk lid position, door lock and unlock requests, ignition switch status, alarm status and gas cap status.

23. The method of claim 17 further comprising:

at least one of stopping the presenting of the at least one selected instruction and selecting at least one different instruction based on at least one of detecting a change in the vehicle component condition, detecting a change in the user's position relative to the vehicle component, delaying for a predetermined amount of time, detecting a user action via the user interface device, and detecting a user action via a vehicle information display.

24. An instruction system for a vehicle having a plurality of vehicle components, the system comprising:

a condition sensor configured to detect and generate at least one output, each output indicative of a vehicle component condition representing an operational status of an associated vehicle component;

a portable user interface device;

at least one position sensor configured to detect a position of the portable user interface device relative to the associated vehicle component based on a location of the portable user interface device;

a memory containing a plurality of instructions, each instruction associated with an intended activity to change the vehicle component condition; and a controller configured to predict the intended activity to change the vehicle component condition based on the vehicle component nearest the position the portable user interface device and the output associated with the vehicle component; select at least one instruction corresponding to the predicted intended activity only after the position has remained unchanged for a predetermined amount of time, and present the at least one selected instruction to change the vehicle component condition.

25. The instruction system of claim 24, wherein the portable user interface device is configured to emit a signal indicative of the user's position and the position sensor detects the location of the portable user interface device based on a strength of the signal from the portable user interface device.

26. The instruction system of claim 24, wherein the at least one selected instruction is provided to the user via the portable user interface device and is at least one of an audible instruction and a visual instruction.

27. The instruction system of claim 24, wherein the controller is further configured to select one of the instructions only after the vehicle component condition has remained unchanged for at least a predetermined amount of time.

28. The instruction system of claim 24, wherein the controller predicts the user's intended activity based on the user's position relative to the vehicle component and the vehicle component condition both remaining unchanged for a predetermined amount of time.

29. The instruction system of claim 24, wherein the controller is further configured to perform one or both of stopping the presenting of the at least one selected instruction and selecting at least one different instruction based on at least one of a change in the vehicle component condition being detected, a change in the user's position relative to the vehicle component being detected, a predetermined amount of time passing, a user action via the user interface device, and a user action via a vehicle information display.

30. The instruction system of claim 24, wherein the user's position is determined to be unchanged based on the portable user interface device remaining within a predetermined distance from the vehicle component.

31. The instruction system of claim 24, wherein the portable user interface includes a user control for wirelessly changing a vehicle component condition, and at least one of the instructions includes a suggestion to activate the user control.

32. The instruction system of claim 24, wherein the controller is further configured to communicate the at least one selected instruction to the portable user interface device, and the portable user interface device presents the at least one selected instruction to the user.

33. The instruction system of claim 24, wherein the controller is further configured to present the at least one selected instruction via an onboard vehicle component.

\* \* \* \* \*